United States Patent
Samokrutov et al.

(10) Patent No.: US 11,092,572 B2
(45) Date of Patent: Aug. 17, 2021

(54) METHOD FOR THE NONDESTRUCTIVE EXAMINATION OF A TEST SPECIMEN BY USE OF ULTRASOUND

(71) Applicant: ACS Solutions GmbH, Saarbruecken (DE)

(72) Inventors: Andrey Samokrutov, Moskau (RU); Roman Pinchuk, Sulzbach (DE); Andrey Bulavinov, Saarbruecken (DE); Viktor Shevaldykin, Moskau (RU)

(73) Assignee: ACS SOLUTIONS GMBH, Saarbruecken (DE)

( * ) Notice: Subject to any disclaimer, the term of this patent is extended or adjusted under 35 U.S.C. 154(b) by 196 days.

(21) Appl. No.: 16/431,970

(22) Filed: Jun. 5, 2019

(65) Prior Publication Data

US 2019/0369059 A1    Dec. 5, 2019

(30) Foreign Application Priority Data

Jun. 5, 2018    (DE) ..................... 10 2018 208 824.1

(51) Int. Cl.
  *G01N 29/07*    (2006.01)
  *G01N 29/44*    (2006.01)

(52) U.S. Cl.
  CPC ......... *G01N 29/4409* (2013.01); *G01N 29/07* (2013.01); *G01N 2291/0289* (2013.01)

(58) Field of Classification Search
  CPC .... G01N 29/12; G01N 29/4409; G01N 29/07; G01N 29/11; G01N 29/449;
  (Continued)

(56) References Cited

U.S. PATENT DOCUMENTS 8,453,509 B2 *   6/2013   Oberdorfer .......... G01N 29/069
                                                     73/632
8,857,263 B2 *  10/2014   Both .................... G01N 29/041
                                                     73/632
(Continued)

FOREIGN PATENT DOCUMENTS

DE    10 2012 109 257 A1    6/2014
DE       102012109257    *   6/2014
(Continued)

*Primary Examiner* — Jacques M Saint Surin
(74) *Attorney, Agent, or Firm* — Fitch, Even, Tabin & Flannery LLP

(57) ABSTRACT

The invention is a method for the nondestructive examination of a test specimen using ultrasound. Ultrasonic waves are coupled into the test specimen with ultrasonic transducers. Ultrasonic waves, which are reflected within the test specimen, are received by the ultrasonic transducers and converted into ultrasonic signals. The method determines an average noise level, to which all discrete signal information is subjected, determines volume elements assigned to each discrete signal information having a signal level with a signal-to-noise ratio R (which is referred to as an average noise level), of 6 dB≤R, determines pairs of volumes separated by a distance A which is equal to or less than a wavelength of the ultrasonic waves coupled into the test specimen. Volumes are combined into a group and the discrete signal information is evaluated, based on at least one of polarization, frequency, wave type and wave mode.

13 Claims, 1 Drawing Sheet

(58) Field of Classification Search
CPC ..... G01N 2291/0289; G01N 2291/106; G01N 2291/052; G01N 29/075; G01N 29/043; G01N 2291/0232
USPC .......................................................... 73/598
See application file for complete search history.

(56) References Cited

U.S. PATENT DOCUMENTS

| | | | |
|---|---|---|---|
| 2007/0266790 A1* | 11/2007 | Gunasekaran | G01N 29/069 73/624 |
| 2012/0036934 A1* | 2/2012 | Kroning | G01N 29/043 73/628 |
| 2012/0055252 A1 | 3/2012 | Boehm et al. | |
| 2016/0146763 A1 | 5/2016 | Mooshofer | |
| 2016/0349171 A1* | 12/2016 | Hull | G01N 19/04 |
| 2017/0058660 A1* | 3/2017 | Hunter | E21B 47/005 |
| 2017/0082582 A1 | 3/2017 | Fendt et al. | |
| 2018/0017533 A1* | 1/2018 | Norli | G01N 29/262 |

FOREIGN PATENT DOCUMENTS

| | | | |
|---|---|---|---|
| DE | 10 2013 211 064 A1 | | 12/2014 |
| DE | 10 2014 209 773 A1 | | 11/2015 |
| EP | 1943508 | * | 7/2008 |
| EP | 1 820 012 B1 | | 7/2010 |
| WO | WO2008071272 | * | 6/2008 |
| WO | 2016/087315 A1 | | 6/2016 |

\* cited by examiner

METHOD FOR THE NONDESTRUCTIVE EXAMINATION OF A TEST SPECIMEN BY USE OF ULTRASOUND

CROSS REFERENCE TO RELATED APPLICATION

Reference is made to German Application No. 10 2018 208 824.1 filed Jun. 5, 2018, which is incorporated herein by reference in its entirety.

BACKGROUND OF THE INVENTION

Field of the Invention

The invention pertains to a method for the nondestructive examination of a test specimen by use of ultrasound, in which ultrasonic waves are coupled into the test specimen with a plurality of ultrasonic transducers and ultrasonic waves reflected within the test specimen are received by a plurality of ultrasonic transducers and converted into ultrasonic signals, wherein the ultrasonic signals are stored and subsequently divided into discrete signal informations by using a propagation time-based, phase-corrected superposition in the course of ultrasonic signal data processing, and wherein each discrete signal information is respectively assigned to a volume element within the test specimen, referred to as a voxel hereinafter.

Description of the Prior Art

The procedure in the nondestructive examination of a test specimen by the use of ultrasound, as for example for the purpose of testing materials with respect to defects such as cracks, inclusions or other material inhomogeneities, comprises coupling ultrasonic waves into the test specimen, detecting the ultrasonic waves that are transmitted through the test specimen or are reflected, diffracted, or at least one of scattered and refracted within the test specimen, and the evaluation of the ultrasonic waves that are converted into ultrasonic signals.

The above-described and generally known examination method makes it possible to detect and evaluate the respective transmission or reflection properties of a test specimen for ultrasonic waves. Due to a corresponding evaluation of the received ultrasonic signals, defects located within a test specimen such as material cracks, foreign material inclusions or material boundaries are mapped in regions with different reflection properties. The position, shape and size of the defects can be three-dimensionally displayed with high spatial resolution.

This method has diverse fields of application. For example, the method is used for testing and measuring homogeneity or strength properties of structural components (concrete walls, ceiling or wall elements, etc.) or for detecting cracks, such as in railway wheels or aircraft components. In this context, the use of the method for testing composite materials is of particular interest.

At the present time, ultrasonic material testing methods are typically characterized by the use of multi-transducer measuring systems in transducer arrays, by use of the internal structure of a test specimen including relevant material discontinuities or material defects which can be visualized in conjunction with suitable signal processing and image reconstruction techniques.

Known defect detection techniques that are based on the coupling, detection and evaluation of ultrasonic waves, particularly with transducer array techniques, respectively concern the evaluation of ultrasonic wave amplitude information and the analysis of the transmission characteristics of the test specimen by use of the transmission technique or the analysis of the reflection characteristics of the test specimen by use of the pulse-echo technique.

A typical test assembly for ultrasonic wave material testing has an ultrasonic transducer or preferably multiple ultrasonic transducers, which couple the ultrasonic waves into the test specimen from one side thereof and receive the returning ultrasonic echo signals, that are the reflected ultrasonic echo signals. The ultrasonic waves reflected in the interior of the test specimen are detected as echo signals and recorded. In this case, only the signal amplitudes of the recorded echo signals are evaluated. The amplitude of an echo signal is directly proportional to the reflection capacity or reflectivity of the reflector and depends on its size, shape, orientation and acoustic properties thereof. In this context, the term acoustic properties primarily refers to the acoustic impedance, which is the product of the density and the acoustic velocity in the material. The greater the difference between the acoustic impedance values within the test specimen and the reflector, the greater the reflectivity of the reflector. Larger reflectors with comparable acoustic properties generate stronger echo signals than smaller reflectors.

One known method for the nondestructive ultrasonic examination of a test specimen is described in EP publication 1 820 012 B1. In this method, ultrasonic waves are emitted into the test specimen by use of multiple ultrasonic transducers, which are arranged on a test specimen surface in a linear or array-shape and also are capable of detecting the ultrasonic wave components reflected within the test specimen, as well as converting these reflected ultrasonic wave components into echo signals. When the measurement is carried out, different emitter/receiver constellations are activated and measuring signals are respectively recorded. Preferably all ultrasonic transducers detect ultrasonic signals and forward the detected ultrasonic signals to be recorded in order to respectively receive the reflected ultrasonic wave components. Depending on the test specimen and the metrological objectives, the examination of the test specimen takes place in the course of multiple individual measuring cycles, in which a corresponding number of measuring signals is respectively obtained and stored.

The evaluation of the ultrasonic signals takes place offline, after the coupling and detection of the ultrasonic waves has taken place, based on a reconstruction algorithm, which is selected in dependence on a virtually pre-definable acoustic irradiation angle or a virtual focusing of the ultrasonic waves coupled into the test specimen and applied to the stored ultrasonic signals. Three-dimensional images of the respective transmission and reflection properties of the test specimen can be calculated from the stored ultrasonic signals with the aid of such reconstruction algorithms without requiring any additional ultrasonic measurements. This reconstruction principle is based on the use of Synthetic Aperture Focusing Technique (SAFT), which projects all received ultrasonic signals on a common time axis. In this case, all ultrasonic signals that are reflected by a particular reflector can be added up in an equiphase manner. A subsequent reconstruction of arbitrary acoustic irradiation angles results from a phase-shifted addition of the reception signals of different ultrasonic receivers. This generally known offline evaluation makes possible synthetic reconstruct at nearly any wave angle and to thereby perform an ultrasonic sweep through the stored data set.

The detection capability of the ultrasonic examination is significantly limited, particularly when conventional testing and analyzing techniques are used for examining test specimens that have acoustically inhomogeneous material properties. For example concrete or similar construction materials have an increased acoustic attenuation of the ultrasonic waves and a high level of structural acoustic noise. For example, the conventional amplitude-based signal evaluation does not provide any evaluable or reliable information, for example, on the filling level of a jacket tube of steel in a concrete test specimen. That is whether the jacket tube which is embedded within a concrete matrix is filled entirely, partially or not at all. The amplitude of the metrologically acquired echo signal of the ultrasonic waves, which are reflected on the tube with different filling levels, primarily depends on the geometric dimensions of the tube, as well as the impedance difference between the concrete matrix and the steel material from which the jacket tube is made. However, information on the filling level cannot be obtained in this way.

DE 10 2014 209 773 A1 discloses a method and a device for examining a component, wherein internal structures of the component such as defects are reconstructed which are dependent on acquired ultrasonic measuring values, by use of SAFT, and one or more structural elements, as well as their position, which are determined in the reconstruction. The ultrasonic inspection is simulated by use of a simulation model for the individual structural elements and the obtained simulation values are compared with the ultrasonic measuring values. Model parameters, on which the simulation is based, are changed in the course of an optimization process in dependence on a difference between the simulation values and the ultrasonic measuring values so that the model parameters describe the constitution of the respective structural element more precisely than prior to the optimization.

DE 10 2013 211 064 A1 describes a SAFT analysis of defects which are near the surface of an object, in which the sound propagation time from a probe positioned at a measuring point of the location of the examined voxel is directly measured and used for determining points in time of amplitudes to be added up in A-image time signals.

DE 10 2012 109 257 A1 discloses a method and a device for generating an ultrasonic image, in which ultrasonic transducer elements of a point focus-controlled 2D ultrasound matrix array emit correlated ultrasonic signals that simultaneously arrive in a focus area due to consideration of corresponding delay times and interfere once at this location. The measuring signals from the focus area are added up with consideration of the respective delay times and a respective amplitude value from the measuring signal sum is assigned in a measuring value matrix for voxels lying in the focus area. The ultrasonic image is generated by using the measuring value matrix.

US published patent application 2012/0055252 A1 discloses a method and a device for detecting radially and axially oriented defects in cylindrical test specimens, wherein a coupling device of the ultrasonic waves has at least one radial and one tangential component. A segment or even the entire volume of the test specimen can be examined for defects by moving the probe along the surface.

WO 2016/087315 A1 discloses an ultrasound imaging method, in which ultrasonic waves are emitted by M ultrasonic transducers and received by N ultrasonic transducers and geometry-dependent artifacts are filtered. For this purpose, the theoretical propagation times $T_{ij}(P)$, which an ultrasonic wave requires from the i-th emitter to the j-th receiver, are calculated for each point P in the area to be examined and for each emitter/receiver pair. In addition, the propagation times $T_{ijgeom}$ for ultrasonic waves, which are reflected on a reflection surface of the test specimen, are calculated for each emitter/receiver pair. Only the amplitudes $S_{ij}(t)$ and the propagation times $T_{ij}(P)$ of which significantly differ from $T_{ijgeom}$ are added up for each point P.

SUMMARY OF THE INVENTION

The invention is a method of nondestructive examination of a test specimen by use of ultrasound, which makes possible examination of test specimens with acoustically nonhomogeneous materials or material areas, and in particular test specimens with embedded jacket tubes that may have different filling levels, over the internal structure of the test specimen with enhanced detection capability.

The inventive method is based on the information content of the ultrasonic signals obtained by ultrasonic transducers not only including the time-dependent amplitude information, but also including other relevant signal information such as the wave type, polarization, frequency, modulation, etc., of the respectively received ultrasonic waves. The additional signal contents, which are referred to as signal information content below, include additional information about the test object to be examined.

With the method of the invention for the nondestructive examination of a test specimen by use of ultrasound, ultrasonic waves are coupled into the test specimen with ultrasonic transducers and ultrasonic waves which are reflected within the test specimen which are received by ultrasonic transducers and converted into ultrasonic signals. The ultrasonic signals are stored and subsequently divided into discrete signal information by using a propagation time-based, phase-corrected superposition during the ultrasonic signal data processing. Each discrete signal information is respectively assigned to a volume element (voxel) within the test specimen. The method has the following steps:

Ultrasonic waves, which may be ultrasonic transverse waves or ultrasonic longitudinal waves, are respectively emitted or coupled into the test specimen with a two-dimensional distributed array of n of individual ultrasonic transducers, which are preferably DPC (DPC—Dry-Point-Contact) transducers arranged on the surface of a test specimen to be examined. The ultrasonic waves, which are reflected at the interfaces between areas having different acoustic density within the test specimen, are received preferably, with all of the ultrasonic transducers, arranged on the test specimen surface. The correspondingly resulting ultrasonic signals are stored and subjected to subsequent ultrasonic signal data processing.

A propagation of time-based, phase-corrected superposition of the ultrasonic signals, which is obtained from discrete signal informations, which is carried out and a three-dimensional volume (voxel) of the test specimen is reconstructed, which preferably represents the entire test specimen volume. Each discrete signal information is respectively assigned to a volume element (a voxel) within the test specimen. The volume elements that are obtained due to the superposition are preferably chosen to be equidimensional, which means they are spatially identical.

The ultrasonic signals generated in the course of the signal detection and the signal information contained therein are subjected to technically related noise from which the average noise level is determined.

Based on the determined noise level, all voxels which respectively have a signal-to-noise ratio of at least 6 decibels which is determined to be an average noise level, are furthermore identified. In this way, all voxels with a lower S/N ratio than 6 decibels can be ignored during the further evaluation because it is assumed that no relevant ultrasonic reflection events have taken place in these test specimen volumes.

All voxels or volumes have a spatial distance A from one another which is equal to or less than a wavelength λ of the ultrasonic waves coupled into the test specimen, that is preferably less than or equal to half this wavelength, are also determined. In this way, volume groups or voxel groups are formed, which respectively are a volume or within the test specimen that surrounds a spatially coherent reflector.

Subsequently, the signal information assigned to each voxel within a combined volume or voxel group is statistically evaluated. The statistical evaluation is based on at least one of volume or the signal information contents which are polarization, frequency, wave type and wave mode. The statistical evaluation is always based on identical signal information contents of the respectively groups of volumes or voxels in order to ultimately determine a degree of similarity between the respectively identical signal information contents of the combined volumes or voxels.

In contrast to the previous prior art signal evaluation practice, which is exclusively based on signal amplitudes, the invention performs that the signal evaluation based on the additional signal information contents regarding polarization, wave type, frequency and/or wave mode, which are included in the signal information.

The evaluation of the respective signal information assigned to each voxel is carried so that a degree of similarity between respectively identical signal information contents of the signal information is determined. The examination of the test specimen is based on the degree of similarity. In order to determine, for example, the acoustic density of a test specimen with a heterogeneous material composition, at least the degree of similarity of the polarizations included in the signal information is determined in the course of the evaluation of the discrete signal information within a volume or voxel group, wherein the degree of similarity is proportionally related to the acoustic density of the test specimen within the group. Alternatively or additionally, the degree of similarity of the wave type, wave mode and the frequency, which are included in the signal information of the individual volumes or voxels which are combined into a group, can also be determined in order to obtain information on the acoustic properties of the test specimen to be examined.

The degree of reliability of the statistical evaluation can be enhanced by increasing the number of ultrasonic transducers participating in the data acquisition. With respect to the evaluation of the acoustic density of a test specimen to be examined, the higher the evaluated degree of similarity between respectively identical signal information contents of the volumes or voxels which are combined into a group, the lower the acoustic density of the test specimen is within the group in question. Vice versa, volumes or voxels within the test specimen having low acoustic density groups, are respectively associated with identical signal information contents that are subject to a greater deviation or a greater divergence, respectively.

In comparison with conventional ultrasonic testing methods, the method of the invention improves detection of defects and provides enhanced information pertaining to the spatial acoustic density distribution within a test specimen, which is preferably for the following test applications:

determining the filling level of a jacket tube within a concrete construction determining the degree of corrosion of a steel reinforcement within a test specimen, evaluating the degree of adherence of a tunnel tubing, and detecting material with weak reflection capacity.

BRIEF DESCRIPTION OF THE DRAWINGS

Exemplary embodiments of the invention are described below with reference to the drawings and without limitation of the general inventive idea. In these drawings.

DETAILED DESCRIPTION OF THE INVENTION

Figure 1:
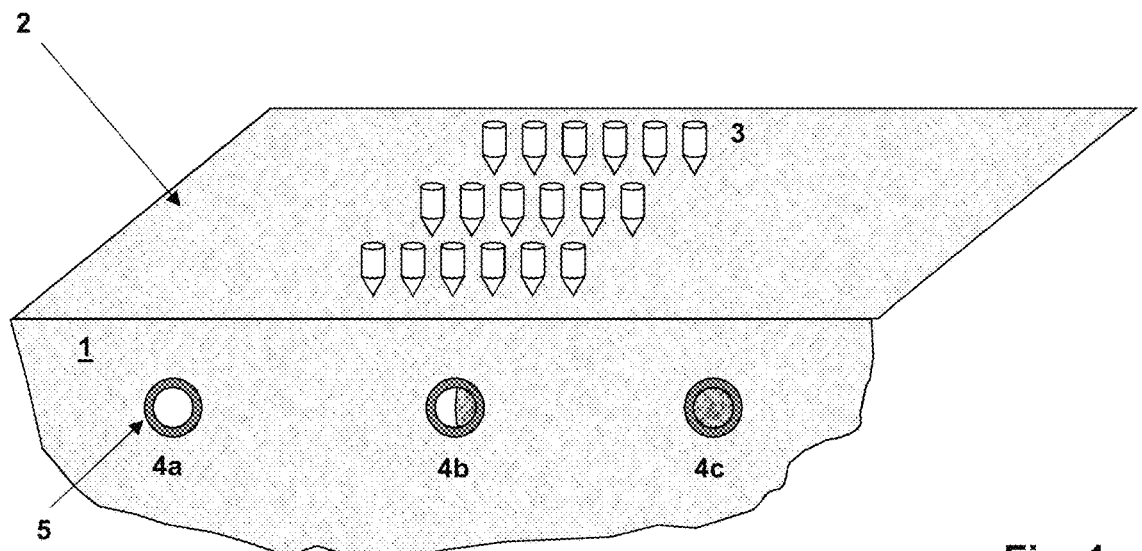
FIG. 1 shows a schematic representation of a test specimen with jacket tubes that have different filling levels.

FIG. 1 shows a test specimen 1, having a surface 2 on which an array-like assembly of (n=18 DPC) ultrasonic transducers 3 is arranged. In the example shown, three jacket tubes 4a, 4b are 4c are within the test specimen 1, which preferably is concrete or a similar inhomogeneous construction material. The jacket tubes have a jacket tube wall 5 that is preferably steel and are respectively surrounded by the concrete matrix of the test specimen 1. The filling level of the individual jacket tubes 4a, 4b and 4c is measured which respectively differs in the example according to FIG. 1. In this case, the jacket tube 4a is empty, the jacket tube 4b is half full and the jacket tube 4c is completely full, for example with a liquid such as water or with solid sediments.

Figure 2:
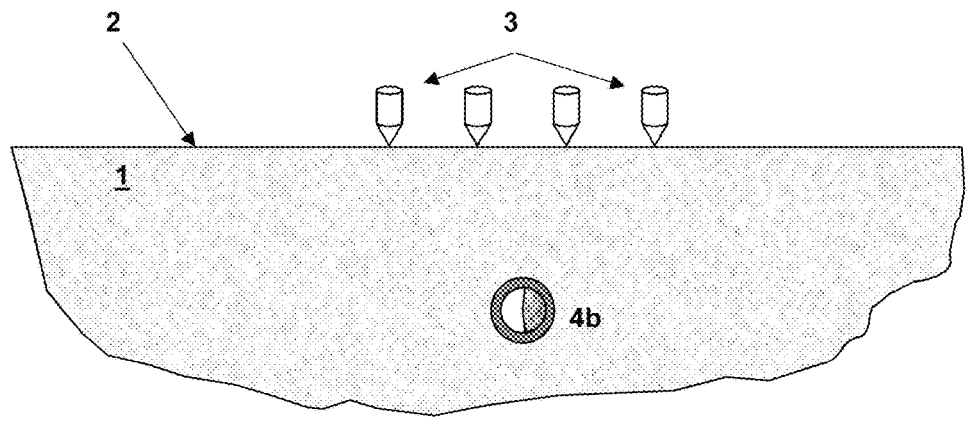
FIG. 2 shows a schematic representation for determining the acoustic density of a half filled jacket tube within a test specimen by use of an ultrasonic transducer assembly.
Figure 2:
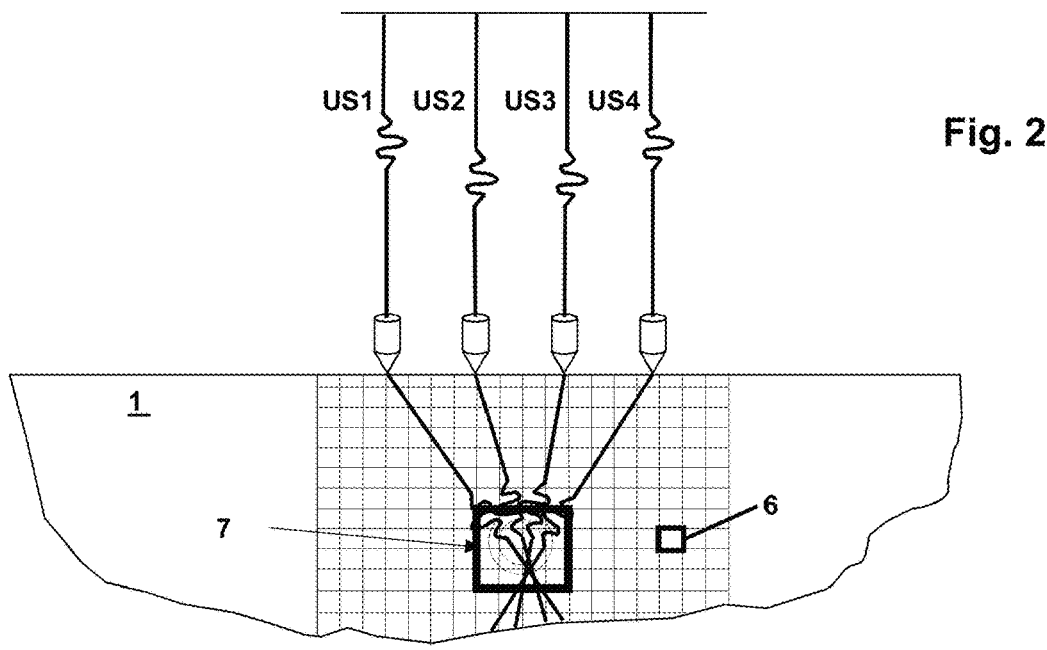

In FIG. 2, the upper illustration shows a measuring situation and the lower illustration shows a measurement evaluation. The ultrasonic transducers 3 are arranged on the surface 2 of the test specimen 1 relative to the half full jacket tube 4b. The ultrasonic transducers 3 respectively emit ultrasonic waves simultaneously into the test specimen 1 and detect the ultrasonic wave components reflected on or in the jacket tube. The reflected ultrasonic wave components, which arrive at the location of the ultrasonic transducers after respectively traveling propagation paths of different lengths, are converted into ultrasonic signals US1, US2, US3 and US4 which are stored and evaluated offline based on a reconstruction algorithm.

In the course of the evaluation, at least part of the test specimen volume is divided into uniformly dimensioned volume elements (voxels) 6. Signal information is respectively assigned to the volumes or voxels. The signal information results from the superposition of all ultrasonic signals, which are respectively received from a voxel or volume 6 from the n ultrasonic transducers. Only volumes or voxels 6 has the signal information which have a metrologically relevant signal-to-noise ratio. That is the signal level deviates from the average noise level by at least 6 dB, which is used for the evaluation. Volumes or voxels 6, having a spatial separation distance from one another, which preferably is equal to or less than half the ultrasonic wavelength of the ultrasonic waves emitted into the test specimen 1, are combined into a volume or voxel group 7 for the evaluation. In the example according to FIG. 2, these are all volumes or voxels that at least partially contain the jacket tube 4b. In this context, see the volumes or voxels 6 located within the group 7 which is defined by bold lines.

The polarization information per voxel or volume 6, which is included in each information signal, preferably is used for the signal evaluation from which a degree of similarity between the individual polarization information of the voxels or volumes combined into a group 7 is determined. The higher the determined degree of similarity, the lower the acoustic density within the examined volume of the test specimen 1. In this way, the filling level within the jacket tube 4b can be deduced based on the determined degrees of similarity between the individual volumes or voxels 6 regarding the polarization information.

The frequency information, information on the wave type or wave mode also can be used for correspondingly determining a degree of similarity.

LIST OF REFERENCE SYMBOLS

1 Test specimen
2 Test specimen surface
3 Ultrasonic transducer
4a, 4b, 4c Jacket tube
5 Jacket tube wall
6 Voxel or Volume
7 Voxel or Volume group
US1, US2, US3 and US4 Ultrasonic signals

The invention claimed is:

1. A method for nondestructive examination of a test specimen by use of ultrasound in which ultrasonic waves are coupled into the test specimen by ultrasonic transducers and ultrasonic waves are reflected within the test specimen, are received by ultrasonic transducers and are converted into ultrasonic signals with the ultrasonic signals being stored and subsequently divided into discrete signal information by time-based phase-corrected superposition ultrasonic signal data processing with each discrete signal information being assigned to a different volume within the test specimen comprising:
   (a) determining an average noise level to which all detected ultrasonic signals and discrete signal informations are subjected;
   (b) determining the volumes within the test specimen from which the discrete signal informations have an average signal to noise level of at least 6 dB;
   (c) determining from the volumes determined in step (b) within the test specimen volumes which are spaced from other volumes within the test specimen by a spacing distance equal or less than a wavelength of the ultrasonic waves that are coupled into the test specimen;
   (d) combining the volumes determined in step (c) into a volume group; and
   (e) evaluating the discrete signal informations of the volume group by at least one of signal information contents related to polarization, frequency, wave type and wave mode.

2. The method according to claim 1, wherein:
the discrete signal information assigned to each volume element is determined by use of propagation time-based, phase-corrected superposition and includes ultrasonic signal components of ultrasonic signals of all ultrasonic transducer combinations obtained by the coupling and receiving performed by the ultrasonic transducers.

3. The method according to claim 2, wherein:
the ultrasonic signal components include information regarding amplitude, polarization, frequency and wave type and wave mode.

4. The method according to claim 3, wherein:
$A \leq \lambda/2$ of the coupled ultrasonic wavelength $\lambda$ and A is the spacing distance between the volumes.

5. The method according to claim 3, wherein:
the evaluation of signal information within the group is carried out as a statistical evaluation having a degree of similarity between respectively identical signal information contents of the signal information which is determined with the examination of the test specimen being based on the degree of similarity.

6. The method according to claim 3, for determining the acoustic density of a test specimen with a heterogeneous material composition, comprising:
   at least a degree of similarity of polarizations included in the discrete signal informations is determined during evaluation of discrete signal informations within the group, wherein the degree of similarity is proportionally related to acoustic density of the test specimen within the group.

7. The method according to claim 2, wherein:
$A \leq \lambda/2$ of the coupled ultrasonic wavelength $\lambda$ and A is the spacing distance between the volumes.

8. The method according to claim 7, for determining the acoustic density of a test specimen with a heterogeneous material composition, comprising:
   at least a degree of similarity of polarizations included in the discrete signal informations is determined during evaluation of discrete signal informations within the group, wherein the degree of similarity is proportionally related to acoustic density of the test specimen within the group.

9. The method according to claim 2, wherein:
the evaluation of signal information within the group is carried out as a statistical evaluation having a degree of similarity between respectively identical signal information contents of the signal information which is determined with the examination of the test specimen being based on the degree of similarity.

10. The method according to claim 2, for determining the acoustic density of a test specimen with a heterogeneous material composition, comprising:
    at least a degree of similarity of polarizations included in the discrete signal informations is determined during evaluation of discrete signal informations within the group, wherein the degree of similarity is proportionally related to acoustic density of the test specimen within the group.

11. The method according to claim 1, wherein:
the evaluation of signal information within the group is carried out as a statistical evaluation having a degree of similarity between respectively identical signal information contents of the signal information which is determined with the examination of the test specimen being based on the degree of similarity.

12. The method according to claim 1, for determining the acoustic density of a test specimen with a heterogeneous material composition, comprising:
    at least a degree of similarity of polarizations included in the discrete signal informations is determined during evaluation of discrete signal informations within the group, wherein the degree of similarity is proportionally related to acoustic density of the test specimen within the group.

13. The method according to claim 1, for determining the acoustic density of a test specimen with a heterogeneous material composition, comprising:
    at least a degree of similarity of polarizations included in the discrete signal informations is determined during evaluation of discrete signal informations within the group, wherein the degree of similarity is proportionally related to acoustic density of the test specimen within the group.

\* \* \* \* \*